United States Patent
Jung et al.

(10) Patent No.: US 8,165,250 B2
(45) Date of Patent: Apr. 24, 2012

(54) AUTOMATIC GAIN CONTROL DEVICE, SIGNAL RECEIVING APPARATUS, AND SIGNAL RECEIVING METHOD

(75) Inventors: Jae Ho Jung, Daejeon (KR); Kwang Chun Lee, Daejeon (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 806 days.

(21) Appl. No.: 12/329,854

(22) Filed: Dec. 8, 2008

(65) Prior Publication Data

US 2009/0154617 A1   Jun. 18, 2009

(30) Foreign Application Priority Data

Dec. 14, 2007  (KR) .................. 10-2007-0131495

(51) Int. Cl.
*H04L 27/08* (2006.01)

(52) U.S. Cl. ...................................... 375/345

(58) Field of Classification Search .............. 375/345, 375/316, 354, 326, 340, 346; 455/136, 138, 455/130, 230, 232.1, 234.1, 239.1, 240.1, 455/245.1, 246.1, 247.1; 370/203, 208, 210; 708/400, 401, 402, 403, 404, 405
See application file for complete search history.

(56) References Cited

U.S. PATENT DOCUMENTS

| | | | |
|---|---|---|---|
| 7,542,530 B2 | 6/2009 | Cho et al. | |
| 2004/0052319 A1* | 3/2004 | Wakamatsu | 375/343 |
| 2006/0176093 A1* | 8/2006 | Song et al. | 327/179 |
| 2006/0222118 A1 | 10/2006 | Murthy et al. | |
| 2007/0230635 A1* | 10/2007 | Wilhelmsson et al. | 375/345 |
| 2007/0248197 A1 | 10/2007 | Lee et al. | |
| 2007/0258549 A1 | 11/2007 | Cheng et al. | |
| 2008/0031387 A1* | 2/2008 | Shin et al. | 375/345 |
| 2009/0023404 A1* | 1/2009 | Leinonen et al. | 455/114.2 |

FOREIGN PATENT DOCUMENTS

| | | |
|---|---|---|
| KR | 10-2005-0060635 A | 6/2005 |
| KR | 10-2006-0014100 A | 2/2006 |
| KR | 10-2006-0014749 A | 2/2006 |
| KR | 10-2007-0081381 A | 8/2007 |

* cited by examiner

*Primary Examiner* — David C. Payne
*Assistant Examiner* — Vineeta Panwalkar
(74) *Attorney, Agent, or Firm* — Jefferson IP Law, LLP

(57) ABSTRACT

An apparatus and method of receiving signal are provided. The apparatus includes an amplifier that controls a gain according to a gain control signal and amplifies a received signal to generate an amplified signal, an analog-to-digital (A/D) converter that converts the amplified signal into a digital signal, a Fourier transform unit that performs Fourier transform of the digital signal to a frequency domain signal to generate a Fourier transform signal, a demodulator that demodulates the Fourier transform signal to generate a demodulated signal, and an automatic gain control unit that divides the Fourier transform signal into a noise period and a symbol period, calculates the signal level of the noise period based on the signal level of the symbol period, and generates the gain control signal according to the signal levels of the symbol period and the noise period.

17 Claims, 6 Drawing Sheets

AUTOMATIC GAIN CONTROL DEVICE, SIGNAL RECEIVING APPARATUS, AND SIGNAL RECEIVING METHOD

CROSS-REFERENCE TO RELATED APPLICATION

This application claims priority to and the benefit of Korean Patent Application No. 10-2007-0131495 filed in the Korean Intellectual Property Office on Dec. 14, 2007, the entire contents of which are incorporated herein by reference.

BACKGROUND OF THE INVENTION (a) Field of the Invention

The present invention relates to an automatic gain control device, a signal receiving apparatus, and a signal receiving method. In particular, the present invention relates to a signal receiving apparatus and a signal receiving method that can implement efficient automatic gain control.

(b) Description of the Related Art

An automatic gain control (AGC) device is used to reduce quantization noise during demodulation by uniformizing the levels of signals in a signal receiving apparatus. The AGC device automatically adjusts the gain according to the level of the received signal so as to uniformize the levels of signals input to an analog-to-digital (A/D) converter. A general AGC device calculates the integral value of the received signal and controls the gain according to the calculated integration value.

However, such an AGC device is useful for operation of a cyclic received signal, but in order to calculate the signal level in a time domain, many arithmetic units are needed.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a signal receiving apparatus having an advantage of efficiently performing automatic gain control on a noncyclic signal.

An exemplary embodiment of the present invention provides an automatic gain control device including: a symbol synchronization search unit that searches symbol synchronization of a received signal and counts the number of symbols according to the searched symbol synchronization; a symbol period search unit that divides the received signal in a frequency domain into a symbol period and a noise period according to bandwidth; and a controller that calculates the signal level of the symbol period for the received signal in the frequency domain, calculates the signal level of the noise period based on the signal level of the symbol period, and generates a gain control signal according to the signal levels of the symbol period and the noise period.

The symbol synchronization search unit may include a symbol synchronization search unit that searches symbol synchronization from a preamble of the received signal in a time domain, and a counter that counts the number of symbols from a synchronous point of time searched by the symbol synchronization search unit.

The controller may include: a signal level arithmetic unit that samples the received signal in the frequency domain to calculate the signal level of each symbol; a data memory that sequentially stores the signal level according to the count number of the counter, and stores the signal level of the noise period to be the same as the signal level of the symbol period; and a control signal arithmetic unit that generates the gain control signal according to the signal level stored in the data memory corresponding to the sampled received signal.

The control signal arithmetic unit may include a lookup table that stores a control signal according to the signal level, and a digital-to-analog (D/A) converter that converts the control signal into the gain control signal as an analog voltage.

The automatic gain control device may further include an integrator that calculates the average of a plurality of signal levels stored in the data memory to calculate the signal level of the sampled received signal.

The signal level arithmetic unit may include an adder.

Another embodiment of the present invention provides a signal receiving apparatus including: an amplifier that controls a gain according to a gain control signal and amplifies a received signal to generate an amplified signal; an analog-to-digital (A/D) converter that converts the amplified signal into a digital signal; a Fourier transform unit that performs Fourier transform of the digital signal to a frequency domain signal to generate a Fourier transform signal; a demodulator that demodulates the Fourier transform signal to generate a demodulated signal; and an automatic gain control unit that divides the Fourier transform signal into a noise period and a symbol period, calculates the signal level of the noise period based on the signal level of the symbol period, and generates the gain control signal according to the signal levels of the symbol period and the noise period.

The automatic gain control unit may include: a symbol synchronization search unit that searches symbol synchronization from the digital signal and counts the number of symbols according to the searched symbol synchronization; a symbol period search unit that divides the Fourier transform signal into the symbol period and the noise period according to bandwidths; a signal level arithmetic unit that samples the Fourier transform signal to calculate the signal level of each symbol; a data memory that sequentially stores the signal level according to a count number by the symbol synchronization search unit and stores the signal level of the noise period to be the same as the signal level of the symbol period; and a control signal arithmetic unit that generates the gain control signal according to the signal level stored in the data memory.

The control signal arithmetic unit may include a lookup table that stores a control signal according to the signal level, and a digital-to-analog (D/A) converter that converts the control signal into the gain control signal as an analog voltage.

The control signal arithmetic unit may further include an integrator that calculates an average of a plurality of signal levels stored in the data memory to calculate the signal levels of a plurality of Fourier transform signals.

The signal receiving apparatus may further include an auxiliary automatic gain control unit that samples the digital signal to calculate a signal level, generates an auxiliary gain control signal according to the signal level, and outputs the generated auxiliary gain control signal to the amplifier.

Yet another embodiment of the present invention provides a signal receiving method including: converting a received signal into a baseband received signal; amplifying the baseband received signal according to a gain to generate an amplified signal; performing Fourier transform on the amplified signal to generate a Fourier transform signal; dividing the Fourier transform signal into a noise period and a symbol period; calculating the signal level of the noise period based on the signal level of the symbol period and generating the gain control signal according to the signal levels of the symbol period and the noise period; and adjusting the gain according to the gain control signal.

The generating of the gain control signal may include sampling the Fourier transform signal to calculate the signal level of each symbol and setting the signal level of the noise period to be the same as the signal level of the symbol period, and generating the gain control signal according to the signal level of the symbol period and the set signal level of the noise period.

The signal receiving method may further include calculating an average signal level of the signal levels of at least two symbol periods and the set signal level of the noise period.

The generating of the gain control signal may include generating the gain control signal as an analog voltage according to the signal level.

The signal receiving method may further include sampling the digital signal to calculate a signal level, and generating an auxiliary gain control signal according to the signal level.

The adjusting of the gain may include receiving the gain control signal and the auxiliary gain control signal, and changing the gain.

According to the embodiments of the present invention, when a non-cyclic burst signal is received, the non-cyclic burst signal is divided into a signal presence period and a signal absence period, and the gain is only controlled by using the signal presence period. Therefore, accuracy of the signal level can be secured and the signal level of the symbol can be calculated in the frequency domain, thereby reducing complexity.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" and variations such as "comprises" or "comprising" will be understood to imply the inclusion of stated elements but not the exclusion of any other elements. In addition, the terms "-er", "-or", "unit", and "module" described in the specification mean units for processing at least one function and operation and can be implemented by hardware components or software components and combinations thereof.

Figure 1:
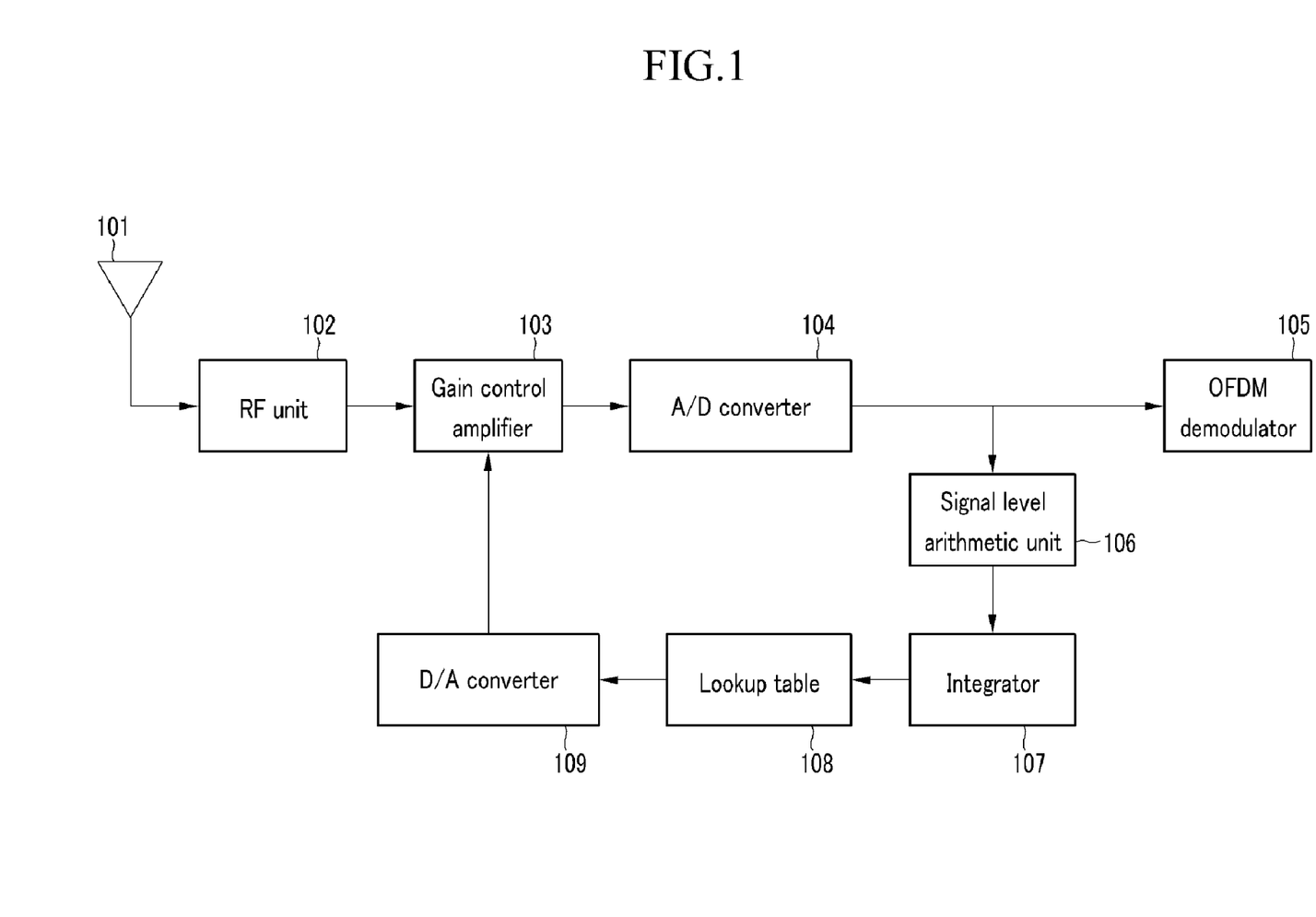
FIG. 1 is a block diagram illustrating a signal receiving apparatus according to an exemplary embodiment of the present invention.

FIG. 1 is a block diagram illustrating a signal receiving apparatus according to an exemplary embodiment of the present invention.

Referring to FIG. 1, a signal receiving apparatus according to an exemplary embodiment of the present invention includes an antenna 101, an RF unit 102, a gain control amplifier 103, an analog-to-digital (A/D) converter 104, an OFDM demodulator 105, a signal level arithmetic unit 106, an integrator 107, a lookup table 108, and a digital-to-analog (D/A) converter 109.

The lookup table 108 defines the relationship between a signal level and a control signal.

Figure 2:
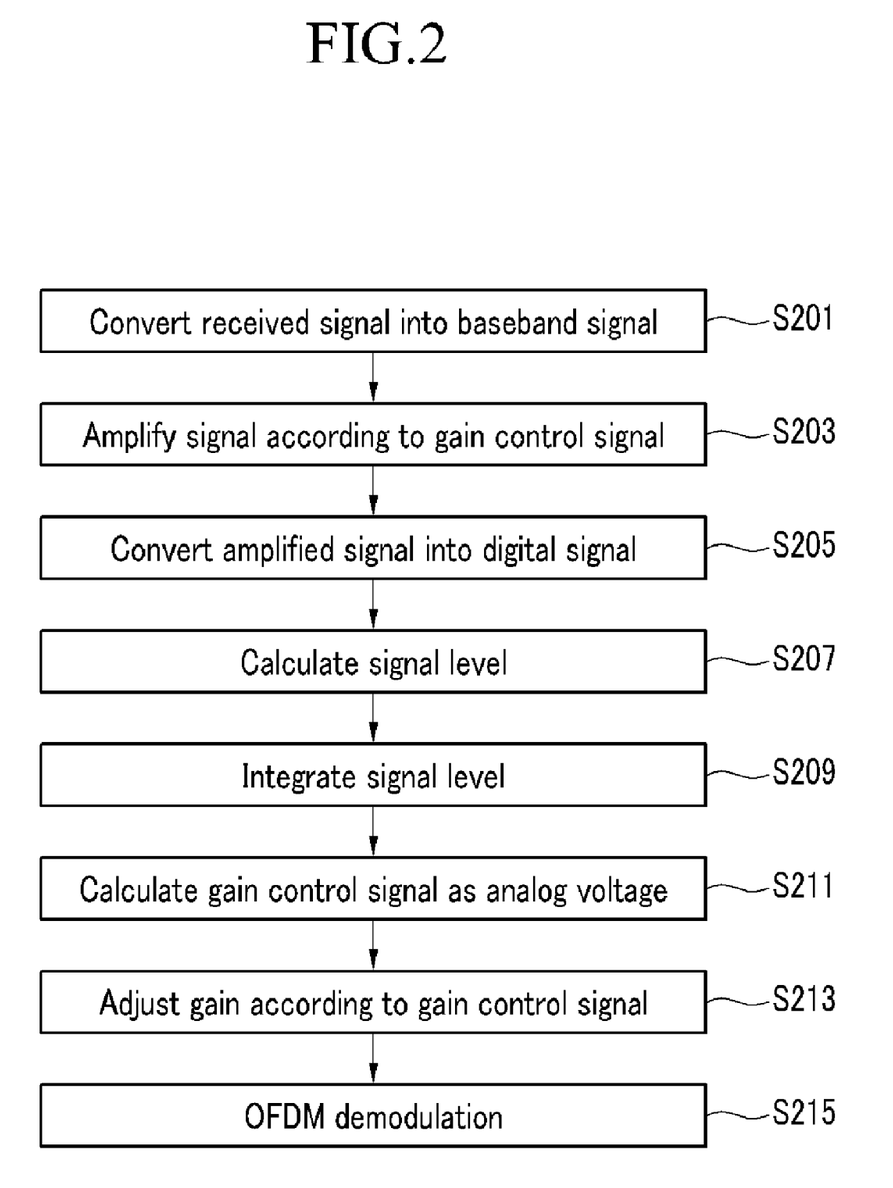
FIG. 2 is a flowchart illustrating the operation of the signal receiving apparatus shown in FIG. 1.

FIG. 2 is a flowchart illustrating the operation of the signal receiving apparatus shown in FIG. 1.

First, if the signal receiving apparatus receives analog signals through the antenna 101, the RF unit 102 converts the received signals into baseband signals and filters the baseband signals on channels to generate output signals (S201).

The gain control amplifier 103 receives a gain control signal from the D/A converter 109, and adjusts the amplifier gain according to the gain control signal. Then, the gain control amplifier 103 amplifies the output signals of the RF unit 102 to signals of a predetermined level according to the adjusted gain, and outputs the amplified signals (S203).

The A/D converter 104 converts the amplified signals into digital signals and outputs the converted digital signals (S205).

The OFDM demodulator 105 receives the digital signals, and performs Fourier transform, channel estimation, and demodulation on the received digital signals (S215).

The signal level arithmetic unit 106 samples some of the digital signals output from the A/D converter 104 to calculate the levels of the signals (S207).

The integrator 107 integrates the signal levels calculated by the signal level arithmetic unit 106, and calculates the average of a plurality of the signal levels to calculate the level of each of the sampled digital signals (S209). The integrator 107 performs closed-loop integration with a stable gain while taking time constant into consideration. The integrator 107 may include an infinite impulse response (IIR) filter.

In this case, for a stable closed-loop operation, it is necessary to appropriately adjust the time constant of the integrator 107.

The D/A converter 109 reads a control signal stored in the lookup table 108 according to the signal level calculated by the integrator 107. The D/A converter 109 converts the read control signal into an analog voltage to generate the gain control signal, and outputs the generated gain control signal to the gain control amplifier 103 (S211).

The gain control amplifier 103 adjusts the amplifier gain according to the gain control signal from the D/A converter 109, amplifies the output signals of the RF unit 102, and outputs the amplified signals to the A/D converter 104 (S213).

The signals received through the antenna 101 may be continuous circuit-type signals or noncyclic burst-type signals.

Next, a signal receiving apparatus that can effectively control a gain regardless of the type of signal will be described with reference to FIG. 3 to FIG. 5B.

Figure 3:
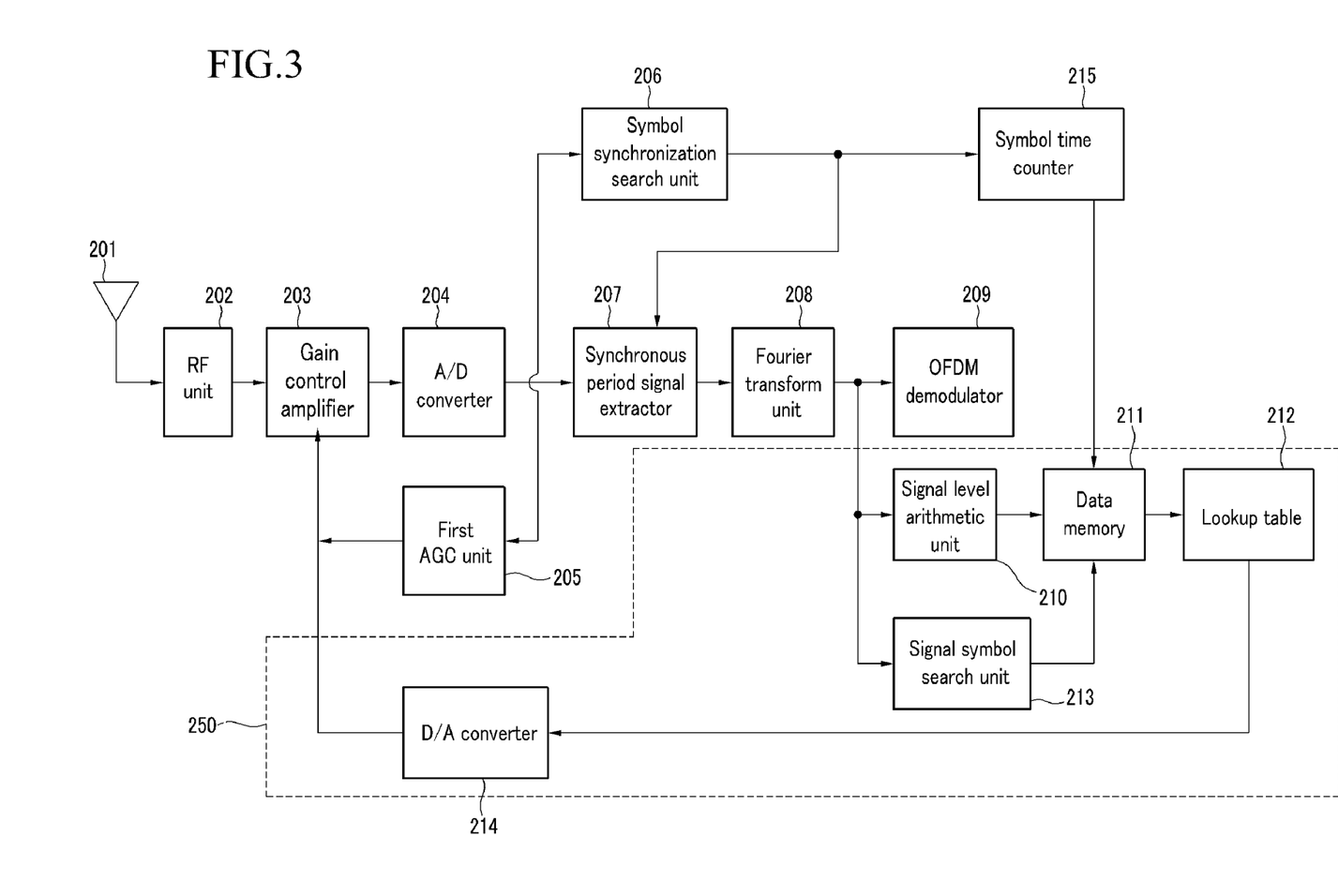
FIG. 3 is a block diagram illustrating a signal receiving apparatus according to another embodiment of the present invention.

FIG. 3 is a block diagram illustrating a signal receiving apparatus according to another embodiment of the present invention.

Referring to FIG. 3, a signal receiving apparatus according to another embodiment of the present invention includes an antenna 201, an RF unit 202, a gain control amplifier 203, an analog-to-digital (A/D) converter 204, a first automatic gain control (AGC) unit 205, a symbol synchronization search unit 206, a symbol time counter 215, a synchronous period signal extractor 207, a Fourier transform unit 208, an OFDM demodulator 209, and a second AGC unit 250.

The first AGC unit 205 may include a signal level arithmetic unit, an integrator, a lookup table, and a digital-to-analog (D/A) converter, as shown in FIG. 1. The second AGC unit 250 includes a signal level arithmetic unit 210, a data memory 211, a lookup table 212, a signal symbol search unit 213, and a 214.

The lookup table 212 stores the relationship between a signal level and a control signal.

Figure 4:
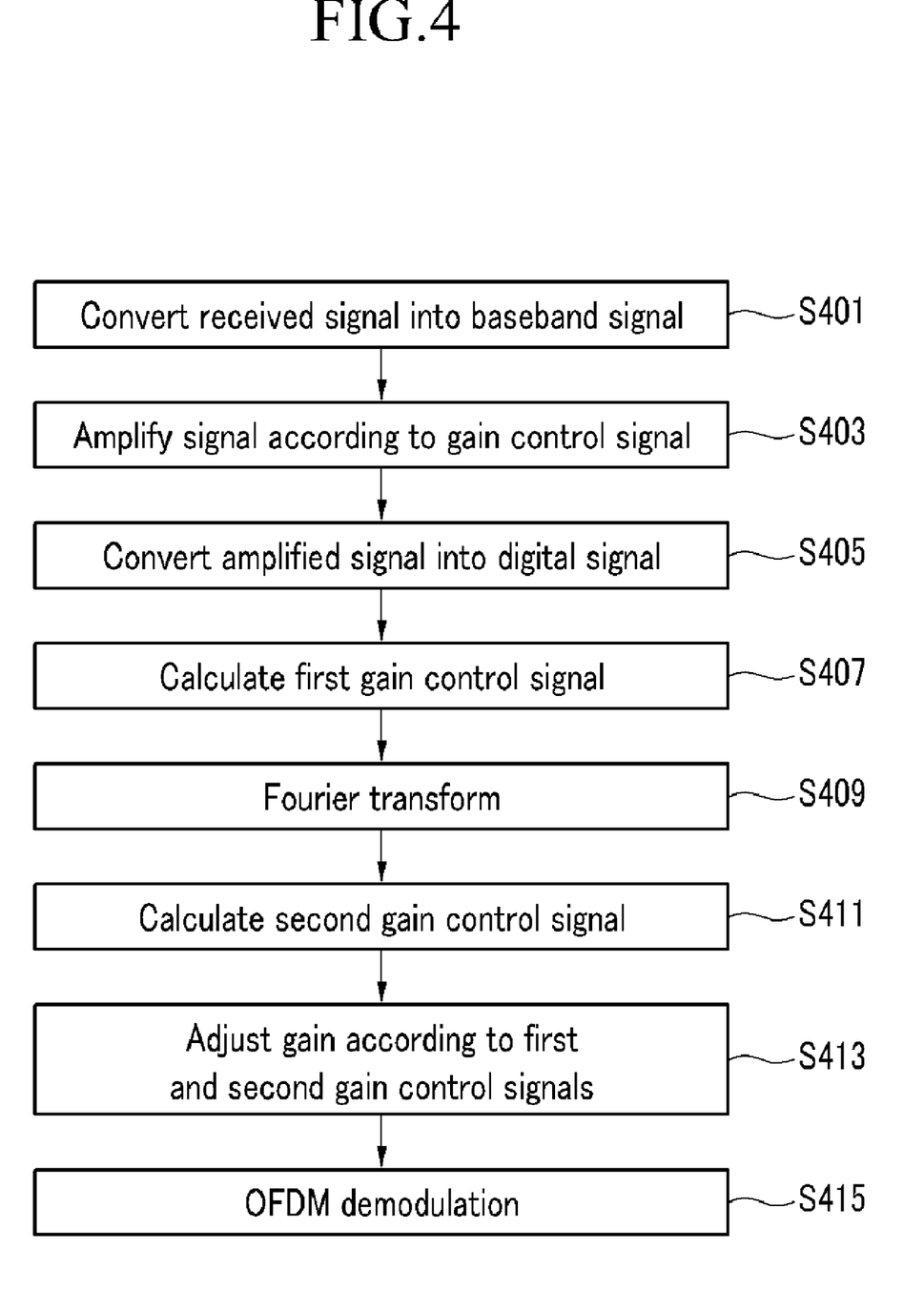
FIG. 4 is a flowchart illustrating the operation of the signal receiving apparatus shown in FIG. 3.
Figure 5A:
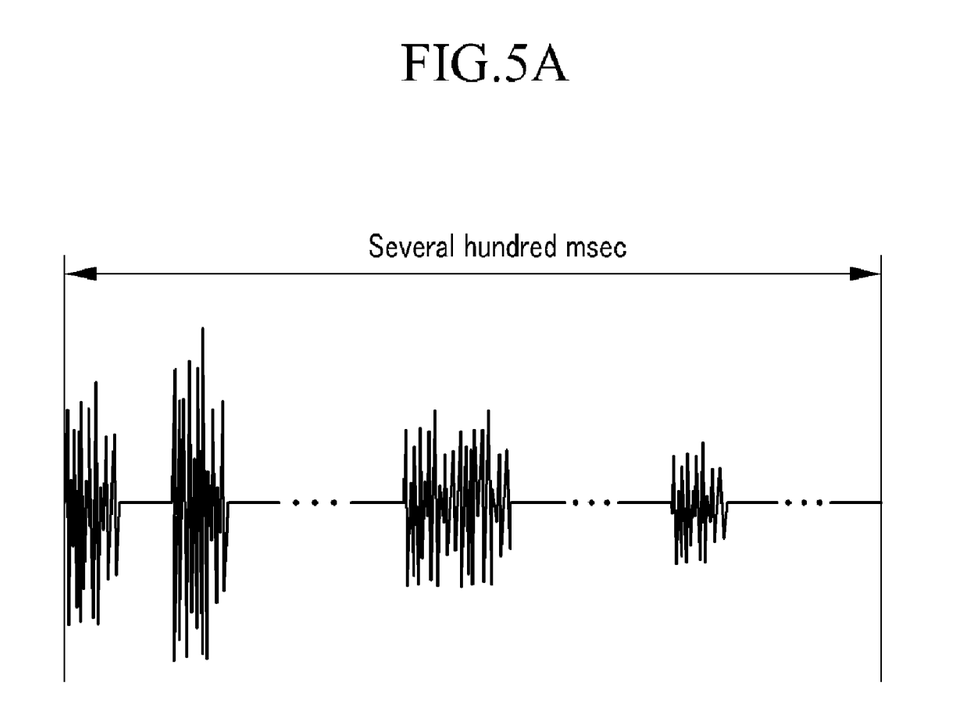
FIGS. 5A and 5B are signal waveform charts illustrating automatic gain control according to another embodiment of the present invention.
Figure 5B:
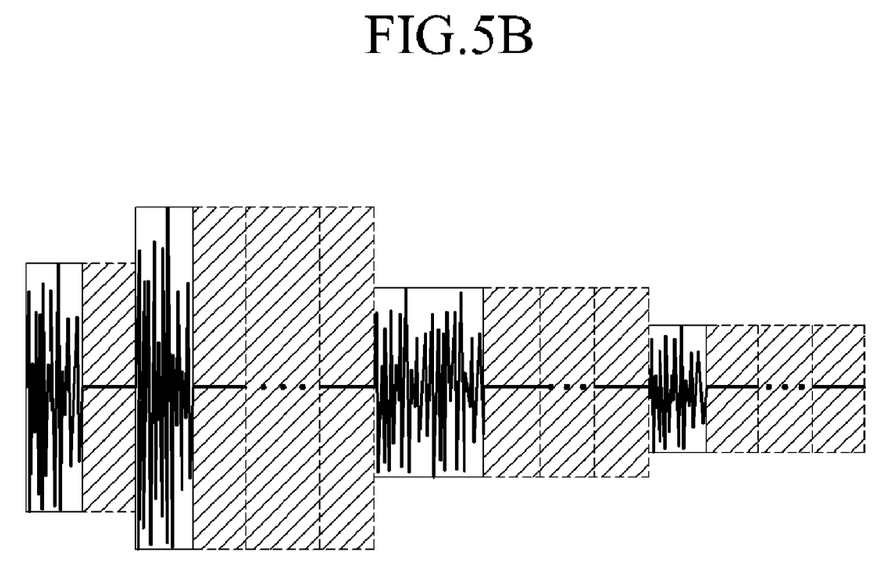

FIG. 4 is a flowchart illustrating the operation of the signal receiving apparatus shown in FIG. 3, and FIGS. 5A and 5B are signal waveform charts illustrating automatic gain control according to another embodiment of the present invention.

First, if the signal receiving apparatus receives analog signals through the antenna 201, the RF unit 202 converts the received signals into baseband signals and filters the baseband signals on channels to generate output signals (S401).

The gain control amplifier 203 receives a first gain control signal from the first AGC unit 205, and also receives a second gain control signal from the D/A converter 214 of the second AGC unit 250. Then, the gain control amplifier 203 amplifies the output signals of the RF unit 202 to signals at a predetermined level according to the first and second gain control signals, and outputs the amplified signals (S403).

The A/D converter 204 converts the amplified signal into digital signals and outputs the converted digital signals (S405).

The first AGC unit 205 samples some of the digital signals output from the A/D converter 204 to calculate the levels of the signals, and integrates the calculated signal levels to calculate the level of each of the sampled digital signals, as shown in FIG. 1. Next, the first AGC unit 205 reads a control signal corresponding to the calculated signal level from the lookup table, converts the read control signal into an analog voltage, and outputs the converted analog voltage to the gain control amplifier 203 as the first gain control signal (S407).

At this time, the first AGC unit 205 integrates the digital signals with an integrator having a large time constant to perform slow automatic gain control, thereby securing the reliability of a symbol synchronization search.

The symbol synchronization search unit 206 searches symbol synchronization by using the preambles of the digital signals, and outputs symbol synchronization information to the symbol time counter 215 and the synchronous period signal extractor 207. The symbol time counter 215 counts the number of symbols from a synchronous point of time according to the symbol synchronization information. That is, the symbol time counter 215 counts the number of symbols in a signal presence period and the number of symbols in a signal absence period for the received burst signal.

The synchronous period signal extractor 207 divides the digital signals into synchronous periods according to the symbol synchronization information from the symbol synchronization search unit 206, and outputs the synchronous periods to the Fourier transform unit 208.

The Fourier transform unit 208 performs Fourier transform on the digital signals from the synchronous period signal extractor 207, and transforms time domain signals to frequency domain signals (S409).

The OFDM demodulator 209 receives the frequency domain signals from the Fourier transform unit 208, and performs channel estimation and demodulation on the received signals (S415).

The second AGC unit 250 receives the output signals of the Fourier transform unit 208, and calculates the second gain control signal according to the output of the symbol time counter 215 (S411).

Specifically, the signal level arithmetic unit 210 samples the signals received through the Fourier transform unit 208 to calculate the signal level for each symbol. In this case, the signal level arithmetic unit 210 calculates the size of one OFDM symbol, which is synchronized by symbol synchronization of the symbol synchronization search unit 206. The signal level arithmetic unit 210 may be implemented with an adder.

The data memory 211 sequentially stores the signal levels from the signal level arithmetic unit 210 according to a count number of the symbol time counter 215.

Meanwhile, the signal symbol search unit 213 divides the output signals from the Fourier transform unit 208 into OFDM symbol signals and noise signals according to bandwidths, that is, into signal presence periods (OFDM symbol periods) and signal absence periods (noise signal periods). The data memory 211 stores as the signal level the signal level of the previous signal absence period in the signal absence period under the control of the signal symbol search unit 213.

Accordingly, for the burst-type signal, the signal level stored in the data memory 211 is the same as that of the continuous signal.

The D/A converter 214 reads the signal level stored in the data memory 211 and finds a control signal corresponding to the read signal level from the lookup table 212. The D/A converter 214 converts the control signal into an analog voltage, and outputs the converted analog voltage to the gain control amplifier 203 as the second gain control signal.

As shown in FIG. 5A, when the signal receiving apparatus receives a burst-type OFDM signal for a long time, for example several hundred milliseconds, if the time constant becomes shorter, the variation of the signal level in the signal absence period is increased and then the gain diverges. Further, if the time constant becomes longer, the automatic gain control becomes slow so as to not follow the change of the received signal, which makes it difficult to perform efficient control.

In this case, as shown in FIG. 5B, the signal symbol search unit 213 searches the signal absence period and stores the signal level of the symbol in the data memory 211 as if a received signal is present, thereby suppressing occurrence of an error in the signal absence period.

The gain control amplifier 203 receives the first and second gain control signals, controls the amplifier gain according to the first and second gain control signals, and amplifies the received signal to a level that is suitable for the signal receiving apparatus (S213).

The second AGC unit 250 can control the gain per OFDM symbol. When channel estimation is performed by using a pilot over several OFDM symbols, the minimum number of channel estimation symbols becomes the minimum time constant. The second AGC unit 250 may further include an integrator between the lookup table 212 and the D/A converter 214. In this case, the second AGC unit 250 can calculate the average of signal levels for a plurality of symbols to calculate the average signal level, and thus can perform automatic gain control while changing the time constant.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An automatic gain control device, comprising:
a symbol synchronization search unit that searches symbol synchronization of a received signal, and counts the number of symbols according to the searched symbol synchronization;
a symbol period search unit that divides the received signal in a frequency domain into a symbol period and a noise period according to bandwidths; and
a controller that calculates the signal level of the symbol period for the received signal in the frequency domain, calculates the signal level of the noise period based on the signal level of the symbol period, and generates a gain control signal according to the signal levels of the symbol period and the noise period.

2. The automatic gain control device of claim 1, wherein the symbol synchronization search unit includes:
a symbol synchronization search unit that searches symbol synchronization from a preamble of the received signal in a time domain; and
a counter that counts the number of symbols from a synchronous point of time searched by the symbol synchronization search unit.

3. The automatic gain control device of claim 2, wherein the controller includes:
a signal level arithmetic unit that samples the received signal in the frequency domain to calculate the signal level of each symbol;
a data memory that sequentially stores the signal level according to the count number of the counter, and stores the signal level of the noise period to be the same as the signal level of the symbol period; and
a control signal arithmetic unit that generates the gain control signal according to the signal level stored in the data memory corresponding to the sampled received signal.

4. The automatic gain control device of claim 3, wherein the control signal arithmetic unit includes:
a lookup table that stores a control signal according to the signal level; and
a digital-to-analog (D/A) converter that converts the control signal into the gain control signal as an analog voltage.

5. The automatic gain control device of claim 4, further comprising
an integrator that calculates the average of a plurality of signal levels stored in the data memory to calculate the signal level of the sampled received signal.

6. The automatic gain control device of claim 5, wherein the signal level arithmetic unit includes an adder.

7. A signal receiving apparatus, comprising:
an amplifier that controls a gain according to a gain control signal and amplifies a received signal to generate an amplified signal;
an analog-to-digital (A/D) converter that converts the amplified signal into a digital signal;
a Fourier transform unit that performs Fourier transform of the digital signal to a frequency domain signal to generate a Fourier transform signal;
a demodulator that demodulates the Fourier transform signal to generate a demodulated signal; and
an automatic gain control unit that divides the Fourier transform signal into a noise period and a symbol period, calculates the signal level of the noise period based on the signal level of the symbol period, and generates the gain control signal according to the signal levels of the symbol period and the noise period.

8. The signal receiving apparatus of claim 7, wherein the automatic gain control unit includes:
a symbol synchronization search unit that searches symbol synchronization from the digital signal and counts the number of symbols according to the searched symbol synchronization;
a symbol period search unit that divides the Fourier transform signal into the symbol period and the noise period according to bandwidths;
a signal level arithmetic unit that samples the Fourier transform signal to calculate the signal level of each symbol;
a data memory that sequentially stores the signal level according to a count number by the symbol synchronization search unit, and stores the signal level of the noise period to be the same as the signal level of the symbol period; and
a control signal arithmetic unit that generates the gain control signal according to the signal level stored in the data memory.

9. The signal receiving apparatus of claim 8, wherein the control signal arithmetic unit includes:
a lookup table that stores a control signal according to the signal level; and
a digital-to-analog (D/A) converter that converts the control signal into the gain control signal as an analog voltage.

10. The signal receiving apparatus of claim 9, wherein the control signal arithmetic unit further includes
an integrator that calculates an average of a plurality of signal levels stored in the data memory to calculate the signal levels of a plurality of Fourier transform signals.

11. The signal receiving apparatus of claim 10, further comprising
an auxiliary automatic gain control unit that samples the digital signal to calculate a signal level, generates an auxiliary gain control signal according to the signal level, and outputs the generated auxiliary gain control signal to the amplifier.

12. A signal receiving method, comprising:
converting a received signal into a baseband received signal;
amplifying the baseband received signal according to a gain to generate an amplified signal;
performing Fourier transform on the amplified signal to generate a Fourier transform signal;
dividing the Fourier transform signal into a noise period and a symbol period;
calculating the signal level of the noise period based on the signal level of the symbol period and generating the gain control signal according to the signal levels of the symbol period and the noise period; and
adjusting the gain according to the gain control signal.

13. The signal receiving method of claim 12, wherein the generating of the gain control signal includes:
sampling the Fourier transform signal to calculate the signal level of each symbol, and setting the signal level of the noise period to be the same as the signal level of the symbol period; and
generating the gain control signal according to the signal level of the symbol period and the set signal level of the noise period.

14. The signal receiving method of claim 13, further comprising calculating an average signal level of the signal levels of at least two symbol periods and the set signal level of the noise period.

15. The signal receiving method of claim 13, wherein the generating of the gain control signal includes generating the gain control signal as an analog voltage according to the signal level.

16. The signal receiving method of claim 15, further comprising:

sampling the digital signal to calculate a signal level; and
generating an auxiliary gain control signal according to the signal level.

17. The signal receiving method of claim 16, wherein the adjusting of the gain includes receiving the gain control signal and the auxiliary gain control signal, and changing the gain.

* * * * *